United States Patent
Suter et al.

(10) Patent No.: US 7,251,338 B2
(45) Date of Patent: Jul. 31, 2007

(54) METHOD FOR HANDLING DATA OF A HEARING DEVICE AND HEARING DEVICE

(75) Inventors: Ruedi Suter, Binz (CH); Andreas Nickisch, Erlenbach (CH)

(73) Assignee: Phonak AG, Stafa (CH)

( * ) Notice: Subject to any disclaimer, the term of this patent is extended or adjusted under 35 U.S.C. 154(b) by 526 days.

(21) Appl. No.: 10/165,902

(22) Filed: Jun. 10, 2002

(65) Prior Publication Data

US 2003/0228026 A1 Dec. 11, 2003

(51) Int. Cl.
*H04R 25/00* (2006.01)

(52) U.S. Cl. .......................... 381/314; 381/60
(58) Field of Classification Search ............... 381/60, 381/312, 314, 323; 73/585; 600/559
See application file for complete search history.

(56) References Cited

U.S. PATENT DOCUMENTS 4,989,251 A * 1/1991 Mangold ................ 381/314
5,144,674 A 9/1992 Kaiser et al.
6,070,799 A 6/2000 Ashe
6,115,478 A * 9/2000 Schneider ................ 381/314
6,201,875 B1 * 3/2001 Davis et al. ............. 381/314
2002/0054689 A1 5/2002 Hou et al.

FOREIGN PATENT DOCUMENTS

EP 0 341 903 A 11/1989
WO 97 01314 A 1/1997

* cited by examiner

*Primary Examiner*—Curtis Kuntz
*Assistant Examiner*—Tuan Duc Nguyen
(74) *Attorney, Agent, or Firm*—Pearne & Gordon LLP

(57) ABSTRACT

A hearing device and method for handling data in a hearing device that enables writing of the data into a storage location only under certain conditions. The conditions are: the data is being entered by a person who has previously entered data to the hearing device or the data has not been copied from a hearing device of a predetermined type or the hearing device has been enabled to unconditionally accept the data.

9 Claims, 1 Drawing Sheet

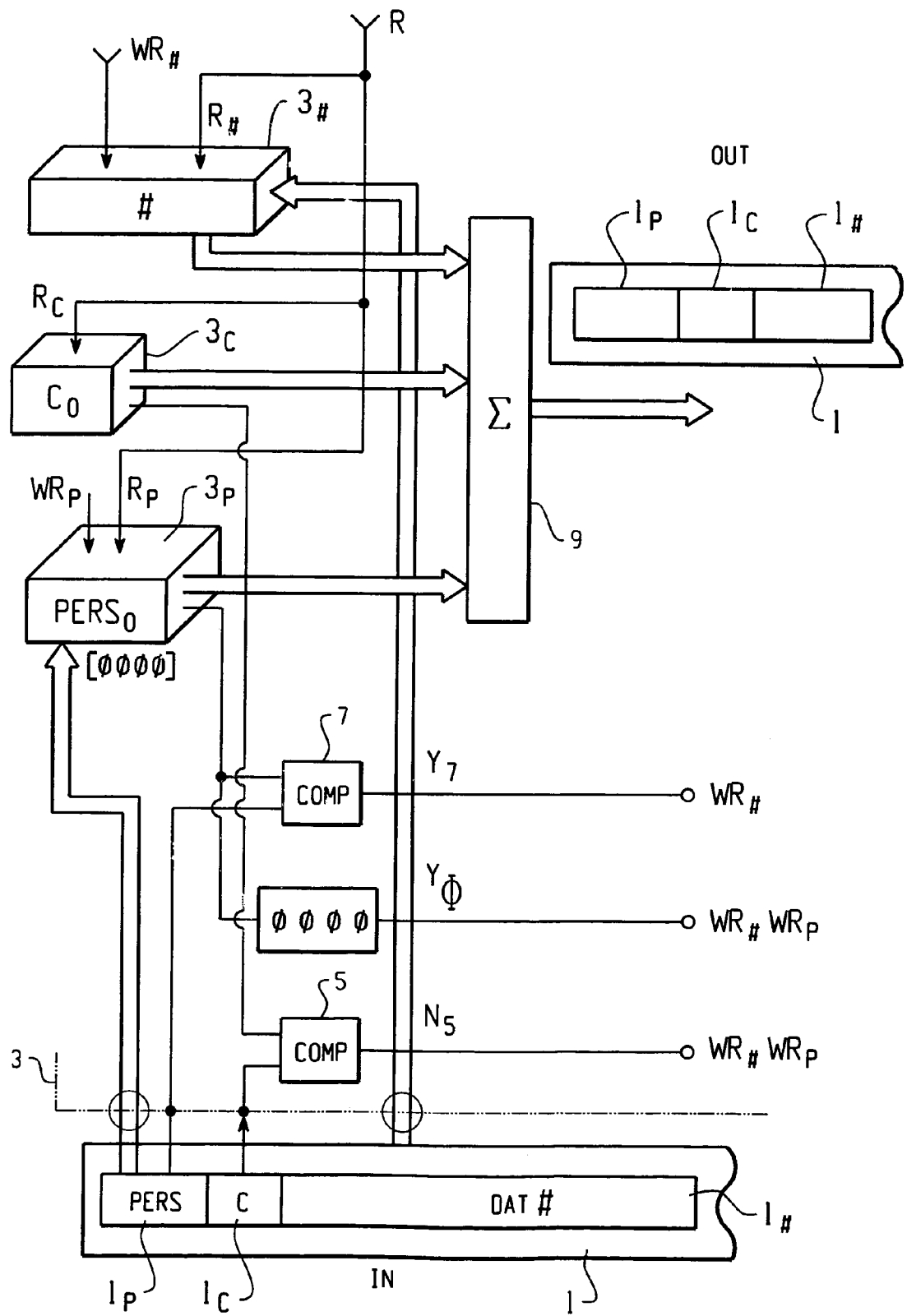

METHOD FOR HANDLING DATA OF A HEARING DEVICE AND HEARING DEVICE

The present invention is directed on a method of handling data of a hearing device, which enables writing of data into a storage location of the hearing device.

Whenever a hearing device is sold by a hearing device selling specialist, such specialist will have to fit the device's acoustical behavior and thus e.g. amplification, filtering to the individual needs of the buyer. This operation must be performed with high accuracy and knowledge and significantly contributes to the selling price of the hearing device.

When such a hearing device, which has been fitted by a skilled person is e.g. to be replaced, the customer may go to a different specialist for buying a new hearing device. Thereby, the new specialist involved may read or copy the fitting data out of the previous hearing device and enter such copied data into the new hearing device. He thereby bypasses all or most of the fitting operations for the new hearing device. Thereby, in fact the labor of the former specialist is just copied, which opens the possibility for the second specialist involved to significantly reduce the selling price.

In view of this problem, it is an object of the present invention to provide for a data handling method for a hearing device, which remedies such drawbacks.

This is realized in that the method according to the present invention comprises enabling writing of data into a storage location of the hearing device only if the data is entered from a person who has entered such data last time to said hearing device, or such data has not been copied from an equal hearing device, or the hearing device is enabled to accept unconditionally such data.

By enabling such writing whenever the data is entered from a person who has entered such data last time to the hearing device, it is made sure that a skilled person, who just before did apply data and thereby especially fitting data to the hearing device, may replace or amend such data anytime. Further, by alternatively enabling such writing whenever the data to be written into the hearing device has not been copied from a hearing device of predetermined type, e.g. from a type of hearing device to which the same data format applies, it is made sure that any skilled artisan may amend or change the said data in the hearing device, if such data has not been acquired just by copying.

By further enabling data writing, as a further alternative, whenever the hearing device has been enabled to unconditionally accept data, it is made sure that a hearing device e.g. leaving the hearing device manufacturer or a hearing device repair location, whereat e.g. a standard fitting data set has been loaded into the hearing device, may be individually fitted by any skilled artisan unconditionally, i.e. irrespective, whether the data has been acquired by copying or not, or irrespective who performed data loading last time.

In a preferred mode of operating the method according to the present invention such method comprises reading the data from the hearing device, thereby adding to said data read a predetermined code. Thus, whenever data is copied from a hearing device this copied data is identified by the said code to have been copied.

In a further preferred mode, additionally, there is added to the data read from the hearing device a further code which specifies a person or location, who or which has previously loaded the data into the hearing device.

By providing such "personal" code to the data read from the hearing device it becomes possible to identify when writing such data to a hearing device, whether or not the same person who before manipulated the data still in the hearing device does now attempt to amend such data. This is allowed, if it is found by code checking that in fact it is the same person or location.

Thereby, this person may clearly apply to the hearing device data which he has copied from a device he fitted himself.

In a further mode of operating the method according to the present invention there is applied to the hearing device a predetermined code in a read-only manner. When applying data to be written into said hearing device, there is checked whether the code applied in read-only manner to the hearing device accords with the predetermined code which is enclosed by former adding with the data to be written. Writing of the data into the hearing device is enabled, if code checking results negatively, thereby indicating that the data intended to be written into the hearing device is not a copy.

In a further preferred mode of operating the method according to the present invention, there is provided at the hearing device a memory unit for a personal code. Whenever data to be written into the hearing device is presented, there is checked whether a personal code within said memory unit accords with a code enclosed to said data to be written. If the result of such checking is affirmative, writing of the data is enabled. This is then the case when the same person, who has formerly manipulated the data in the hearing device, attempts to write data into such device. This especially due to a further preferred mode of operating the method according to the present invention, according to which whenever data is written into the hearing device, the personal code, i.e. the content of the said memory unit, is refreshed. Thus, the content of that memory unit identifies that person, who is entitled to make changes or to apply new data, even data which has been copied from a hearing device having been fitted by the same person.

In a further preferred embodiment of the method according to the present invention, a predetermined code may be loaded by a person or location authorized to do so. Thereby writing of the data into the hearing device is enabled if code according to the predetermined code is present in the data to be loaded.

The hearing device according to the present invention comprises a data storage for fitting data, a read-only storage for a code and a read command input, for enabling writing the content of said data storage onto an external storage, the read command input being operationally connected to both said data storage and said read-only storage and said fitting data being read and written together with the content of said read-only storage.

Further advantages and variants of the method and of the device according to the present invention will become apparent to the skilled artisan when reading the detailed description of an example, how to perform the method and how to realize the device according to the present invention, which are exemplified and described with the help of a figure.

This figure shows in form of a simplified signal flow/functional block diagram one preferred embodiment of a hearing device according to the present invention and whereat data handling is performed according to the method of the present invention.

It is clear that the skilled artisan will recognize a multitude of different realization forms and logical circuitry for realizing the method and the device according to the present invention. Therefore, the detailed description and example shall not restrict the present invention to the described realization form.

The present invention shall now be described by means of an example as shown in the figure.

On an external data carrier 1 fitting data DAT# are stored in a first storage area $1_\#$. In a second storage area $1_c$ a code C may be stored, which is indicative whether the fitting data DAT# has been copied from a hearing device. In a third storage area $1_p$ a personal code may be scored. Whenever the data carrier 1, which may be realized by a removable data carrier as by a floppy disk, a CD-ROM etc., or which is realized by a storage location in a computer, a mobile phone etc. is applied to a hearing device 3, the storage areas $1_p$, $1_c$ and $1_\#$ are read into the hearing device 3.

In the hearing device 3 there is provided a read-only storage $3_c$ containing, inerasable, a code $C_o$. This code $C_o$ is indicative for a type of hearing devices to which the same format and structure of fitting data DAT# apply. The code $C_o$ of read-only memory $3_c$ is preferably recorded in the hearing device 3 by the hearing device manufacturer.

Whenever fitting data from memory area $1_\#$ is to be written into a hearing device 3, the content of storage area $1_c$ is compared with code $C_o$ from read-only memory $3_c$ at a comparing unit 5 within the hearing device 3. Whenever storage area $1_c$ of carrier 1 stores a code C, which is different from $C_o$, thus which is e.g. non-existing or zero, comparison in comparator unit 5 leads to a negative result $N_5$. This indicates that the fitting data DAT# within storage area $1_\#$ has not been copied from a hearing device of the addressed type and a writing command $WR_\#$ is enabled to a memory location $3_\#$ within the hearing device 3.

As was mentioned above the fitting data $1_\#$ on information carrier 1 comprises or is linked to a storage area $1_p$, wherein the person or location, who wants to enter the fitting data DAT# enters a personal code PERS. As discussed above, not copied fitting data are enabled to be written into the hearing device 3 controlled by the signal $N_5$. Thereby, a write command $WR_p$ is enabled for a memory location $3_p$ within the hearing device.

Thus, whenever uncopied data DAT# is written into location $3_\#$, the personal code PERS prevailing in storage area $1_p$ on carrier 1 is written into storage area $3_p$ of the hearing device 3.

Whenever the hearing device 3 leaves the hearing device manufacturer or another authorized person or location, the memory $3_p$ within hearing device 3 may be loaded with a predetermined special code shown in the figure by a 'φφφφ' code. This special code may possibly also be entered into memory $3_p$ whenever e.g. for repair a hearing device 3 has been refreshed with default fitting data at the authorized location.

Whenever the special code 'φφφφ' is loaded in storage $3_p$, writing into storage $3_\#$ is enabled, $WR_\#$ as well as writing into storage $3_p$.

Thus, at a drive 3 with special code in storage $3_p$, data $DAT_\#$ from a carrier 1 may be written into storage $3_\#$ and simultaneously the personal code PERS from carrier 1 is entered into storage $3_p$, overwriting the special code.

Thus, at a "fresh" hearing device, it is always possible to enter fitting data irrespective whether they have been copied from another hearing device 3 or not.

Further, in the hearing device 3 the personal code prevailing in area $1_p$ of data carrier 1 is checked with the personal code $PERS_o$ within storage $3_p$, which has been written to that storage $3_p$, as uncopied fitting data $DAT_\#$ were entered to the hearing device or whenever the hearing device was "fresh" and fitting data $DAT_\#$ were loaded. Thus, at a comparator unit 7 there is checked whether the code $PERS_o$ prevailing in storage $3_p$ accords with the personal code PERS entered from storage area $1_p$ of data carrier 1. If the result of this comparison is affirmative as indicated by signal $Y_7$, then the writing command $WR_\#$ to the storage $3_\#$ of the hearing device 3 is enabled and the data $DAT_\#$ from storage area $1_\#$ of carrier 1 is written.

Thus, fitting data from storage area $1_\#$ are writable into the respective memory location $3_\#$ within hearing device 3 from an external data carrier or storage 1 only if
  such data had not been copied or
  such data is entered by a person, who last entered fitting data to the device 3, or
  whenever the device is coded with the special code.

Only an authorized person or location may delete in a hearing device 3 the instantaneous prevailing personal code $PERS_o$ in storage $3_p$ and overwrite it by the "fresh"-device code as by 'φφφφ'.

Whenever the instantaneously prevailing fitting data # are to be read from a hearing device 3 and copied to a data carrier as of a data carrier 1 shown in the figure, a read-command signal R is applied acting on all three storages $3_\#$, $3_c$ and $3_p$ within hearing device 3. Thus, only the contents of the three storages may be read and written together. Via a linking unit 9 the contents of the storages $3_\#$, $3_c$ and $3_p$ are linked to form an output data set ($1_p$, $1_c$, $1_\#$) on a carrier 1 structured as was explained in context with the input data set 1.

Thus, a person who has installed fitting data in device 3 may always copy such data for storage and reinstall such data to the hearing device 3. If one tries to enter fitting data into the hearing device 3, which data has been copied, this data will only be accepted to be written into the hearing device if the hearing device is fresh or if the same person, who previously entered such data and is registered in storage $3_p$ does enter such copied data.

Only if a person who has not previously loaded fitting data to the respective hearing device presents copied data to the hearing device, such data will not be entered, with the only exception that the hearing device is special-code encoded.

The invention claimed is:

1. A method of handling data of a hearing device comprising the steps of:
  checking for each of the following conditions:
    the data is entered from a person who has entered such data last time to said hearing device;
    the data has not been copied from a further hearing device of a predetermined type; and
    the hearing device is selectively enabled to unconditionally accept such data; and
  enabling writing of said data into said hearing device from an external source exclusively if one of said conditions prevails.

2. The method of claim 1, comprising reading said data from said hearing device, thereby adding to said data read a predetermined code (3c).

3. The method of claim 2, further comprising adding to said data read a further code (3p) specific to a person or location who or which has loaded said data into said hearing device.

4. The method of claim 1, further comprising applying to said hearing device a predetermined code in a read-only manner, applying data to be written into said hearing device, checking whether said predetermined code applied in read-only manner accords with a code in said data to be written and enabling writing of said data into said hearing device if the result of said checking is negative.

5. The method of claim 1, further comprising providing at said hearing device a memory unit (3p) for a personal code, checking whether said personal code within said memory unit accords with a code enclosed with said data to be written and enabling writing of said data into said hearing device if result of said checking is affirmative.

6. The method of claim 1, further comprising loading a predetermined code into said hearing device and enabling writing of said data into said hearing device, if said predetermined code is present in said hearing device.

7. The method of claim 5, further comprising refreshing content of said memory unit if said writing of said data into said hearing device is enabled by a personal code enclosed with said data written into said hearing device.

8. The method of claim 1, wherein said data is fitting data for said hearing device.

9. A hearing device comprising a data storage for fitting data, a read-only storage for a read-only identification code and a read command input enabling writing the content of said data storage onto an external storage, said read command input being operationally connected to both said data storage and said read-only storage and said fitting data being read and written together with the content of said read-only storage so that the written fitting data is identified by said read-only identification code of said read-only storage.

* * * * *